H. C. WAGNER.
SIGNAL LAMP.
APPLICATION FILED NOV. 8, 1911.
1,024,302.
Patented Apr. 23, 1912.
2 SHEETS—SHEET 1.
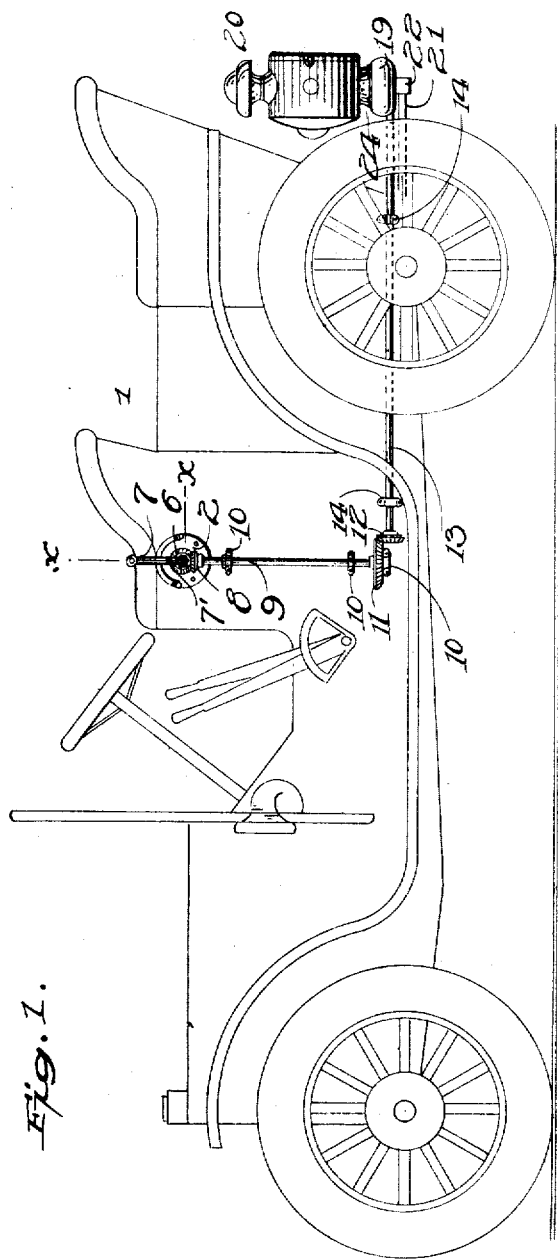
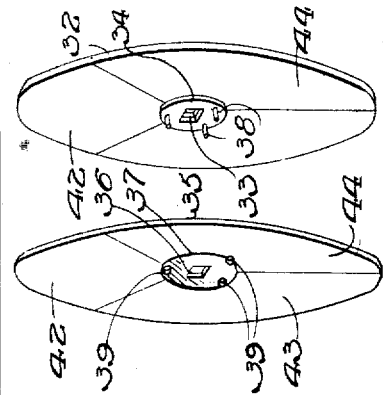
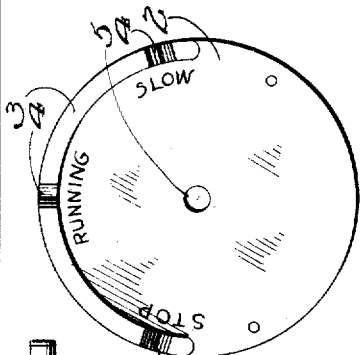
WITNESSES
INVENTOR
Henry C. Wagner
By E. C. Vrooman, Attorney.

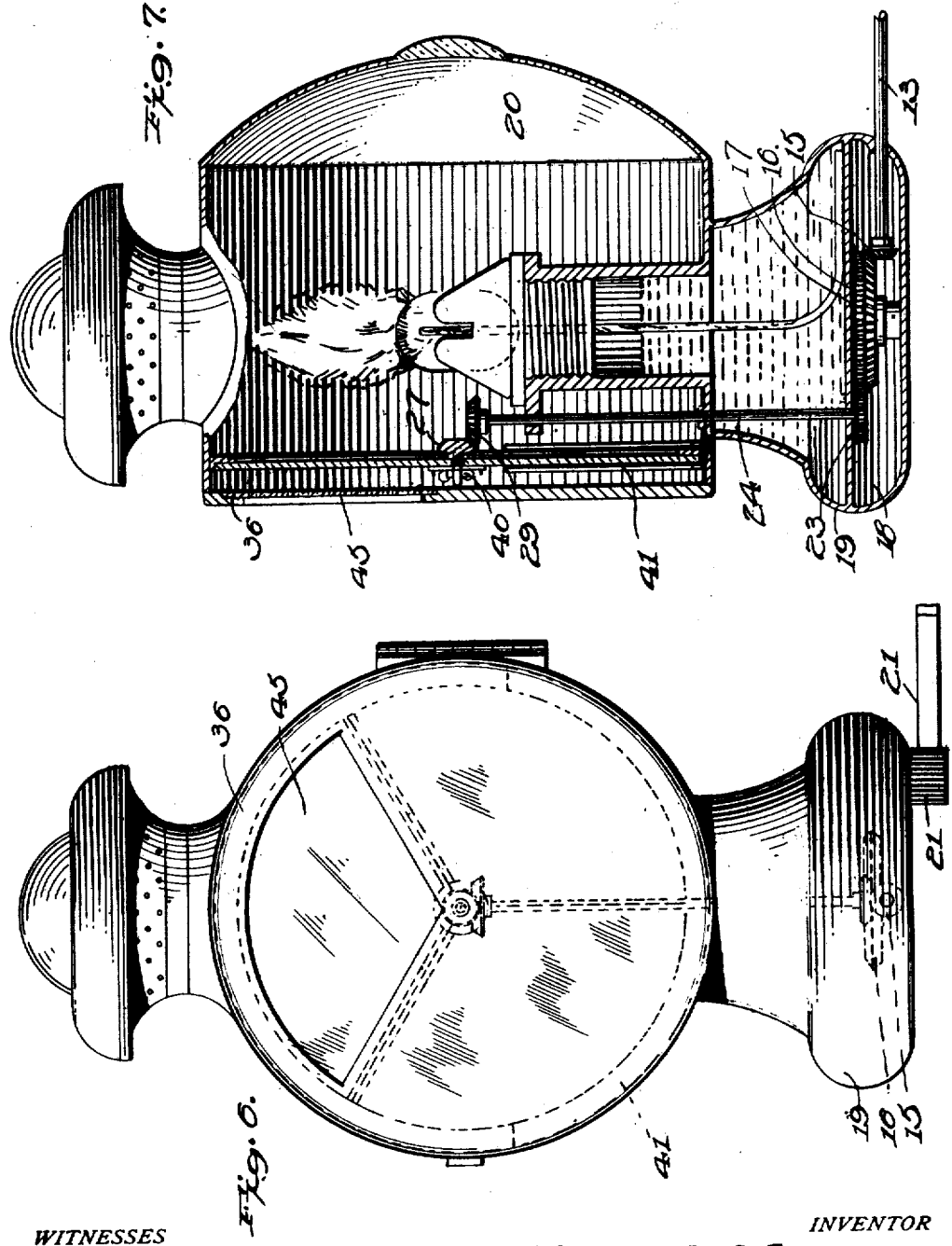

UNITED STATES PATENT OFFICE.

HENRY C. WAGNER, OF BROOKLYN, NEW YORK.

SIGNAL-LAMP.

1,024,302.  Specification of Letters Patent.  Patented Apr. 23, 1912.

Application filed November 8, 1911. Serial No. 659,218.

*To all whom it may concern:*

Be it known that I, HENRY C. WAGNER, a citizen of the United States, residing at Brooklyn, in the county of Kings and State of New York, have invented certain new and useful Improvements in Signal-Lamps, of which the following is a specification, reference being had therein to the accompanying drawing.

This invention relates to signal lamps for automobiles and has for its object to provide a signal lamp and apparatus for operating the same so constructed and arranged that the signals in the lamp may be conveniently operated from the driver's seat.

The invention further has for its object to provide a signal lamp for automobiles and a mechanism for operating the signals in the lamp from the driver's seat whereby different signals may be readily changed in the lamp either for night or day service.

Referring to the accompanying drawings: Figure 1 is a side view of an automobile provided with a signal lamp and operating mechanism constructed and arranged in accordance with this invention. Fig. 2 is a detail view in perspective of one of the parts of the signaling apparatus in the lamp removed therefrom. Fig. 3 is a detail view of a portion of an operating lever showing its hinged joint and controlling spring. Fig. 4 is a detail view in perspective of one of the rotary signal plates employed in the lamp. Fig. 5 is a detail view in perspective of another rotary signal plate employed in the lamp. Fig. 6 is an enlarged front view of the signal lamp. Fig. 7 is a vertical median section through the lamp. Fig. 8 is a detail view of a plate employed in connection with the operating lever.

In carrying out the invention there is mounted on the side of an automobile 1 adjacent to the driver's seat a disk shaped plate 2 having on its upper edge a rib 3 provided with notches arranged at its ends and intermediate thereof, the notches being each located opposite the words "stop", "running" and "slow", as shown in Fig. 4. The plate 2 has a central hole 5 in which is located a shaft of a beveled gear wheel 6 which is manually operated by means of the lever 7 hinged to the beveled gear wheel 6 and projecting upward at the side of the driver's seat so as to be conveniently reached by the driver. The lever 7 is adapted to be swung into and out of engagement with the notches 4 as it is moved with the bevel gear wheel 6 into position to engage a notch 4. The lever 7 is held in engagement with either of the notches 4 by means of a spring 7'. The beveled gear wheel 6 meshes with a toothed gear wheel 8 on the upper end of a rotary shaft 9 having its bearings in suitable supports 10 on the side of the automobile. The lower end of the shaft 10 is provided with a beveled gear wheel 11 which meshes with a beveled gear wheel 12 on the inner end of a rotary shaft 13 extending lengthwise on one side of the automobile and mounted in suitable bearings 14 thereon. The outer end of the rod 13 is provided with a beveled gear wheel 15 which meshes with a toothed wheel 16 mounted on a stub shaft located in a socket 17 in a casing 18 in the foot 19 of the lamp 20. The lamp 20 is supported on an arm 21 projecting from the automobile and connected with a lug 22 on the foot 19 of the lamp. The beveled gear wheel 16 meshes with a beveled gear wheel 23 on the lower end of the vertical shaft 24 projecting into the lamp and mounted in suitable bearings therein.

The signal apparatus comprises a rotatable frame 25 provided with a peripheral flange 26. The frame 25 fits within the lamp 20 and extends between the front of the lamp and the burner and is rotatable therein by means of a beveled gear wheel 27 on which is the hub 28, said beveled wheel 27 meshing with a beveled gear wheel 29 on the upper end of the shaft 24. Projecting from the hub 28 of the frame 25 on the side opposite to the beveled gear wheel 27 is a rectangular projection 30 from which projects a pin 31. Detachably mounted in the frame 25 and having its edge fitting within the flange 26 thereof is a glass plate 32 having a central rectangular opening which is in alinement with the rectangular opening 33 in a reinforcing plate 34 secured to the plate 32. The rectangular projection 30 on the hub 28 of the frame 25 is seated in the rectangular opening in the plate 32 and in the reinforcing plate 34. Detachably mounted on the rectangular projection 30 of the hub 28 is a second plate 35 of opaque material which conforms in shape to the plate 32 and is seated against the same, the plate 35 having a rectangular opening corresponding to the rectangular opening 33 in the plate 34 and also corresponding to a rectangular opening 36 in a reinforcing plate 37 on the plate 35. The plate 35 is held against the plate 32 by means of pins 38 on the plate 34 which fit snugly into the holes 39 in the plate 37. The frame 25 and the plates 32 and 35 are clamped together by means of a wing nut 40 screwed on to the projection 31, bearing against the plate 37 on the plate 35 as shown in Fig. 8. The frame 25 and the plates 32 and 35 move through a pocket 41 in the lamp which serves as a guide therefor. The plates 32 and 35 are provided with colored sections 42, 43, and 44, the section 42 being blue, the section 43 being of an orange color, and the section 44 being green. It will readily be seen that as the plates with the frame 25 are rotated that the different colors will be brought in succession behind the glazed opening 45 of the lamp. The parts mounted, as shown in Fig. 8, are employed in the day time, the different colors on the plate 35 being brought as desired into position behind the lens 45 so as to exhibit the desired color to the same.

When the lamp is used at night the plate 35 is removed by taking off the wing nut 40 and removing the plate 35 and then screwing the wing nut 40 on to the pin 31 and clamping the plate 35 against the frame 25. The lamp being lighted, the light is transmitted through the upper portion of the glass plate 32 thereby transmitting the particular color desired through the opening 45 according to the position to which the plate 32 has been moved. The blue color which is always normally displayed indicates that the car is running while the orange color indicates that the car is going to stop or is standing still, and the green color indicates when the car is going to slow down.

It will be seen from the foregoing description that the different colors may be readily displayed in the lamp by the driver operating the lever 7 at his elbow.

What I claim is:—

1. The combination in an automobile signal lamp having an opening therein; of a rotatable frame mounted in said lamp between the opening and the burner, a glass plate and opaque plate each having different colors detachably mounted on said frame and movable over the lamp opening to display each of said colors, a manually operable lever located adjacent to the seat of a vehicle, and a mechanism connecting said lever with said rotatable frame in the lamp.

2. The combination in an automobile signal lamp having an opening therein; of a frame rotatably mounted in said lamp, a glass plate having different colors mounted on said frame, a detachable opaque plate having different colors mounted on said frame over said glass plate, a manually operable lever located at the seat of a vehicle, and an operative mechanism connecting said lever with said rotatable frame.

3. The combination in an automobile signal lamp having an opening therein; of a rotatable frame mounted in said lamp, a glass plate having different colors mounted on said frame, an opaque plate having different colors and detachably mounted on said frame over said glass plate, the upper end of said plates being movable past the lamp opening, a notched plate located adjacent the seat of a vehicle, a beveled gear wheel on said plate, a handle hinged to said wheel and projecting upward adjacent to the driver's seat, and a gear mechanism connecting said beveled wheel with the rotatable frame in the lamp.

In testimony whereof I hereunto affix my signature in presence of two witnesses.

HENRY C. WAGNER.

Witnesses:
OSCAR F. YOUNGMAN,
JOHN B. PUTNAM.

Copies of this patent may be obtained for five cents each, by addressing the "Commissioner of Patents, Washington, D. C."